(12) United States Patent
Goto et al.

(10) Patent No.: US 8,147,110 B2
(45) Date of Patent: Apr. 3, 2012

(54) LIGHT PIPE ASSEMBLY

(75) Inventors: Kazuhiro Goto, Markham (CA);
Andras Gyimes, Toronto (CA)

(73) Assignee: Tyco Electronics Canada ULC,
Markham, Ontario (CA)

( * ) Notice: Subject to any disclaimer, the term of this patent is extended or adjusted under 35 U.S.C. 154(b) by 265 days.

(21) Appl. No.: 12/364,203

(22) Filed: Feb. 2, 2009

(65) Prior Publication Data

US 2009/0237954 A1 Sep. 24, 2009

Related U.S. Application Data (60) Provisional application No. 61/070,277, filed on Mar. 20, 2008.

(51) Int. Cl.
*F21V 5/00* (2006.01)
*F21V 17/00* (2006.01)
*G02B 6/00* (2006.01)

(52) U.S. Cl. ........ 362/581; 362/551; 362/555; 362/634; 362/616

(58) Field of Classification Search .......... 362/551–582, 362/615–626, 632–634, 220, 225, 269, 270, 362/285, 418, 427
See application file for complete search history.

(56) References Cited

U.S. PATENT DOCUMENTS

| | | | |
|---|---|---|---|
| 3,497,981 A | 3/1970 | Tyne | |
| 4,344,110 A * | 8/1982 | Ruediger | 362/560 |
| 6,095,673 A | 8/2000 | Goto et al. | |
| 6,206,534 B1 | 3/2001 | Jenkins et al. | |
| 6,481,882 B1 * | 11/2002 | Pojar | 362/559 |
| 6,565,225 B2 * | 5/2003 | Mabuchi et al. | 362/610 |
| 6,594,417 B1 * | 7/2003 | Hulse | 385/31 |
| 6,612,729 B1 | 9/2003 | Hoffman | |
| 6,769,799 B2 | 8/2004 | Goto et al. | |
| 6,883,949 B2 | 4/2005 | Goto et al. | |
| 6,910,795 B2 | 6/2005 | Luca et al. | |
| 7,585,097 B2 | 9/2009 | Goto et al. | |
| 7,727,009 B2 | 6/2010 | Goto | |
| 7,802,906 B2 | 9/2010 | Goto et al. | |
| 2003/0174516 A1 | 9/2003 | Goto et al. | |
| 2007/0247831 A1 | 10/2007 | Buelow, II et al. | |
| 2008/0198606 A1 | 8/2008 | Goto | |
| 2008/0198607 A1 | 8/2008 | Goto | |

(Continued)

FOREIGN PATENT DOCUMENTS

WO  WO 2004/027469  4/2004

(Continued)

OTHER PUBLICATIONS

PCT International Search Report; International Application No. PCT/US2009/001681; International filed Mar. 17, 2009.

*Primary Examiner* — Anabel Ton
*Assistant Examiner* — Danielle Allen (57) ABSTRACT

A light pipe assembly includes a lamp assembly and a light pipe. The lamp assembly has a housing that holds a light source configured to emit light. The light pipe is elongated between an attachment end and an opposing distal end. The attachment end is received in the housing of the lamp assembly. The light pipe receives light emitted by the light source. Additionally, the light pipe includes surface elements that are configured to permit the light to emanate from the light pipe between the attachment and distal ends. The surface elements are arranged in a pattern that provides a predetermined distribution of light emanating from the light pipe.

20 Claims, 7 Drawing Sheets

U.S. PATENT DOCUMENTS

2008/0266853 A1 10/2008 Goto
2009/0129100 A1 5/2009 Goto et al.
2009/0201697 A1 8/2009 Goto et al.
2009/0237954 A1 9/2009 Goto et al.
2010/0020558 A1 1/2010 Goto
2010/0091515 A1 4/2010 Goto et al.

FOREIGN PATENT DOCUMENTS

WO  WO 2004/038469  5/2004

* cited by examiner

LIGHT PIPE ASSEMBLY

CROSS-REFERENCE TO RELATED APPLICATIONS

This application claims the benefit of co-pending U.S. Provisional Patent Application No. 61/070,277 filed Mar. 20, 2008, the subject matter of which is herein incorporated by reference in its entirety

BACKGROUND OF THE INVENTION

A light pipe is a typically cylindrical, transparent structure through which light is channeled or transmitted along the longitudinal axis of the light pipe by total internal reflection. Total internal reflection prevents the light from passing from inside the light pipe to outside of the light pipe. Total internal reflection occurs when light impinges on an interface between the light pipe and the atmosphere surrounding the light pipe at an angle that is greater than a critical angle. The critical angle is a function of the indices of refraction for the medium of the light pipe and the medium of the surrounding atmosphere.

The light transmitted by light pipes is generated by a light source. The light source is usually contained in a lamp assembly to which the light pipe is fastened. A typical lamp assembly includes a housing that contains a light source such as a light emitting diode ("LED"). The light pipe should be secured to the lamp assembly to prevent accidental separation of the light pipe from the lamp assembly. In many applications where light pipes are used, the space to accommodate the light pipe and associated lamp assembly is limited. For example, the space available for the light pipe and lamp assembly in interior automobile lighting may be limited. Therefore, typically very little space is available for structures and features that secure the light pipe to the lamp assembly. Current known securing structures include mechanisms such as clamps and epoxies. But, because the light pipe typically has a smooth, cylindrical exterior, the light pipe may easily disconnect from a lamp assembly when known securing structures are used to secure the light pipe to the lamp assembly.

Known light pipes include a white strip or other surface element on the light pipe or inside the light pipe that reflects light impinging on the surface element. At least some of the reflected light strikes the interface between the outside surface of the light pipe and the surrounding atmosphere at an angle that is less than the critical angle of the light pipe-atmosphere interface. This light emanates from the light pipe as emitted light. In order to direct the reflected light in the proper direction, the strip or surface element need to be properly aligned with respect to the lamp assembly.

As the light emanates from the light pipe, the intensity of the emitted light may decrease along the length of the light pipe. For example if too much light escapes from the light pipe in locations near a light source, the light emanating from an opposing end of the light pipe may not be as bright or intense as the light emanating from other parts of the light pipe. Such an uneven distribution of emitted light may be undesirable.

Thus, a need exists to provide a light pipe that more evenly emits light along the length of the light pipe. Moreover, a need also exists for a coupling between the light pipe and lamp assembly that orients the light pipe with respect to the lamp assembly.

BRIEF DESCRIPTION OF THE INVENTION

In one embodiment, a light pipe assembly is provided. The light pipe assembly includes a lamp assembly and a light pipe. The lamp assembly has a housing that holds a light source configured to emit light. The light pipe is elongated between an attachment end and an opposing distal end. The attachment end is received in the housing of the lamp assembly. The light pipe receives light emitted by the light source. Additionally, the light pipe includes surface elements that are configured to permit the light to emanate from the light pipe between the attachment and distal ends. The surface elements are arranged in a pattern that provides a predetermined distribution of light emanating from the light pipe.

In another embodiment, another light pipe assembly is provided. The light pipe assembly includes a lamp assembly and a light pipe. The lamp assembly includes a housing and a light source. The housing has a mating portion. The light source is configured to emit light. The light pipe extends between an attachment end and an opposing distal end. The light pipe is configured to receive light emitted by the light source. The attachment end of the light pipe is coupled with the mating portion of the housing and includes orientation features to align the light pipe with respect to the housing and to secure the light pipe to the housing.

In another embodiment, a light pipe assembly includes a lamp assembly and a light pipe. The lamp assembly has a housing that holds a light source configured to emit light. The light pipe extends between an attachment end and an opposing distal end. The attachment end is received in the housing of the lamp assembly. The light pipe receives light emitted by the light source and includes light-reflective surface elements. The surface elements reflect the light received by the light pipe in directions out of the light pipe between the attachment and distal ends. The surface elements include a plurality of reflective strips interconnected by a reflective line.

DETAILED DESCRIPTION OF THE INVENTION

Figure 1:
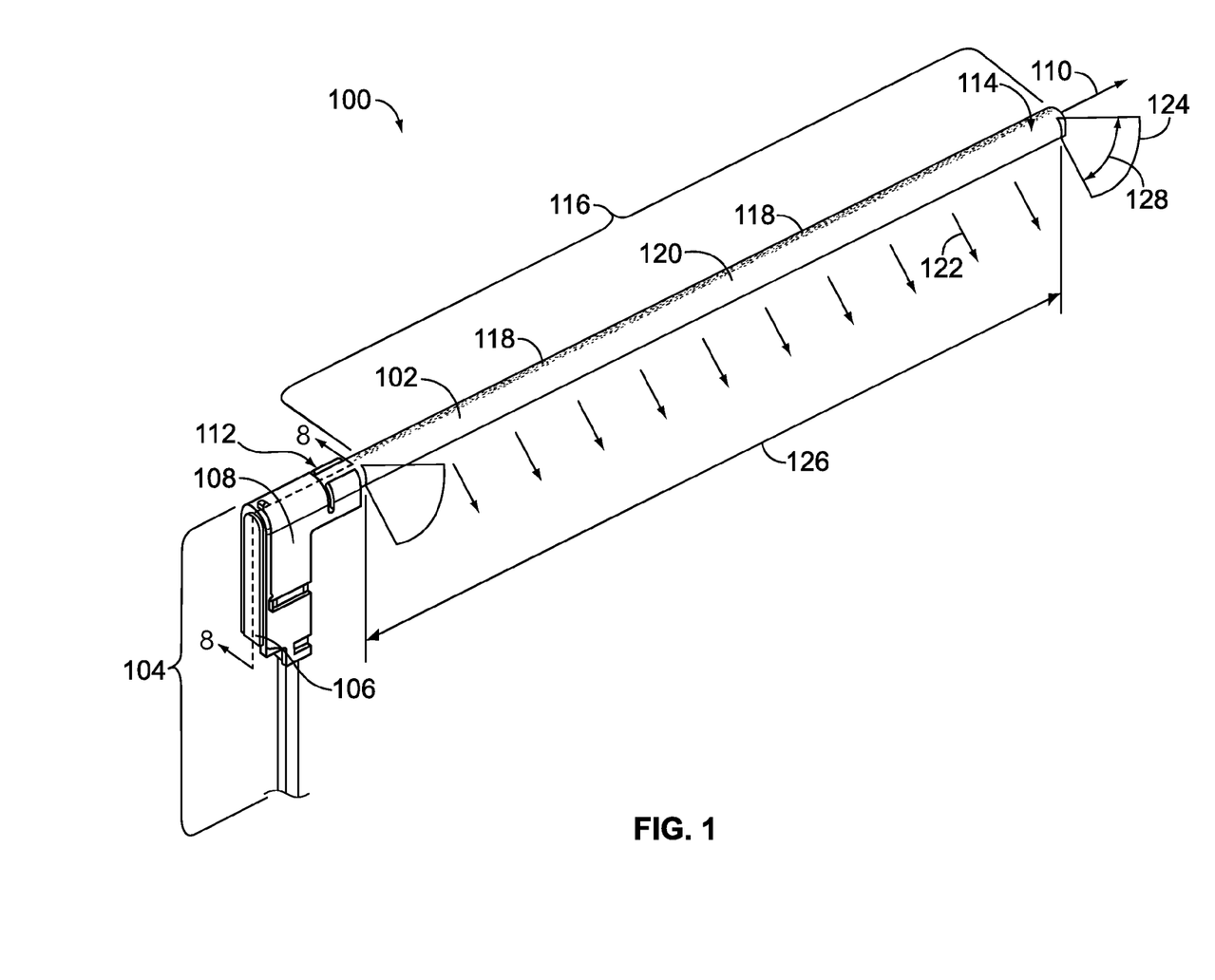
FIG. 1 is an isometric view of a light pipe assembly in accordance with one embodiment of the present invention.

FIG. 1 is an isometric view of a light pipe assembly 100 implemented in accordance with one embodiment. The light pipe assembly 100 includes a light pipe 102 and a lamp assembly 104. The light pipe 102 is elongated along a longitudinal axis 110 between an attachment end 112 and a distal end 114. The light pipe 102 may be formed from a light transmissive material, such as an acrylic material. In one embodiment, the light pipe 102 is an extruded cylindrical rod formed of a translucent acrylic material. Other shapes of the light pipe 102 may be used, including shapes having bends or undulations in the general elongated shape of the light pipe 102 shown in FIG. 1. The diameter or other cross-sectional dimensions of the light pipe 102 may depend on the particular application to which the light pipe 102 is used. For example, one or more embodiments described herein may be particularly suitable for automotive applications and for use with household appliances. Such applications may require relatively small diameters of the light pipe 102.

The lamp assembly 104 includes a light source 106 held in a housing 108. The light source 106 includes one or more individual sources of light that emit the light into the light pipe 102. For example, the light source 106 may be a single light emitting diode or include a plurality of light emitting diodes. A single light source 106 may include more than one type of light generating component. The housing 108 may be formed from a dielectric material such as a polymer. Alternatively, the housing 108 may be formed from a metal. The attachment end 112 of the light pipe 102 is received in the housing 108 to secure the light pipe 102 to the lamp assembly 104 and to orient the light pipe 102 with respect to the lamp assembly 104 such that light emitted by the light pipe 102 is directed in a desired or predetermined direction. The light source 106 emanates light toward the attachment, end 112 of the light pipe 102. The light is transmitted through the light pipe 102 generally from the attachment end 112 toward the distal end 114.

A band or pattern 116 of individual surface elements 118 is provided on the light pipe 102. The surface elements 118 may be separated from one another such that the surface elements 118 are not interconnected with one another. The surface elements 118 may be printed or otherwise adhered to an outer surface 120 of the light pipe 102. Alternatively, the surface elements 118 may be formed on the inside of the light pipe 102. For example, the surface elements 118 may be formed inside the light pipe 102 as the light pipe 102 is extruded. In one embodiment, the surface elements 118 reflect the light that impinges on the surface elements 118. For example, at least some of the light that is transmitted through the light pipe 102 may strike the surface elements 118 and be reflected or scattered by the surface elements 118. The surface elements 118 reflect the light and may cause the light to emanate from the light pipe 102 as emitted light 122. The light 122 may emanate from the light pipe 102 in a direction transverse to the longitudinal axis 110. The emitted light 122 may emanate from the light pipe 102 in a variety of directions, including from a side opposing the surface elements 118. For example, the emitted light 122 may exit the light pipe 102 in directions substantially opposite the surface elements 118. In the example shown in FIG. 1, the emitted light 122 includes light that emanates from a surface of the light pipe 102 that is disposed 180 degrees from the surface elements 118, or on an opposite side of the approximately circular cross-sectional shape of the light pipe 102.

The pattern 116 of the surface elements 118 may be provided along the length of the light pipe 102 in one or more of a shape and distribution in order to provide a desired distribution of the light 122 emanating from the light pipe 102. For example, the pattern 116 may cause the surface elements 118 to reflect the light 122 out of the light pipe 102 in a projected distribution 124. The projected distribution 124 of the light 122 is shown schematically in FIG. 1 and may take alternative sizes and/or shapes. The projected distribution 124 may be defined by a length 126 and a projection angle 128. The length 126 of the distribution 124 represents the distance along the light pipe 102 in a direction parallel to the longitudinal axis 110 that the light 122 emanates from the light pipe 102 in directions transverse to the longitudinal axis 110. The projection angle 128 is the angle subtended by the distribution 124, or the radial distance that the projection angle 128 extends over the surface 120 of the light pipe 102.

Alternatively, the surface elements 118 may include light transmissive elements having an index of refraction that differs from the index of refraction of the light pipe 102. The interfaces between the surface elements 118 and the light pipe 102 may alter the critical angle required for total internal reflection. For example, the surface elements 118 may have an index of refraction that increases the critical angle at the interface between the light pipe 102 and the surface elements 118. Increasing the critical angle may reduce the amount of light that is internally reflected in the light pipe 102 and may increase the amount of light that emanates from the light pipe 102. The light that is refracted by the surface elements 118 may emanate from the light pipe 102 through the surface elements 118. For example, the emanating refracted light may exit the light pipe 102 proximate the same side of the light pipe 102 on which the surface elements 118 are disposed.

In one embodiment, the size and/or spatial density of the surface elements 118 may change in the pattern 116. For example, the size and/or spatial density of the surface elements 18 may increase in the pattern 116 between the attachment and distal ends 112, 114. The spatial density of the surface elements 118 may be defined as the number of surface elements 118 per unit of surface area of the light pipe 102. As described below, the surface elements 118 located in the pattern 116 in locations proximate to the attachment end 112 may be smaller, and/or the density of the surface elements 118 may be less, when compared to the size and/or spatial density of the surface elements 118 in locations proximate to the distal end 114. By controlling the size and/or density of the surface elements 118 in the pattern 116, the amount of emanated light 122 may be controlled along the longitudinal axis 110 of the light pipe 102. For example, less light may emanate from the light pipe 102 in locations near the attachment end 112 where the surface elements 118 are smaller and/or are provided in a lesser spatial density. The size and/or density of the surface elements 118 increases along the longitudinal axis 110 of the light pipe 102 toward the distal end 114, to compensate for the reduced amount of light impinging on each surface element 118. For example, a lesser amount of the light transmitted within the light pipe 102 may be reflected by the surface elements 118 and emanate from the light pipe 102 near the attachment end 112 than the surface elements 118 near the distal end 114. The size and/or density of the surface elements 118 may be tailored to provide an approximately uniform distribution of light 122 emanating from the light pipe 102 along the longitudinal axis 110 between the attachment and distal ends 112, 114. For example, the light 122 may emanate from the light pipe 102 such that no appreciable gradient in the intensity of the emitted light 122 exists.

Figure 2:
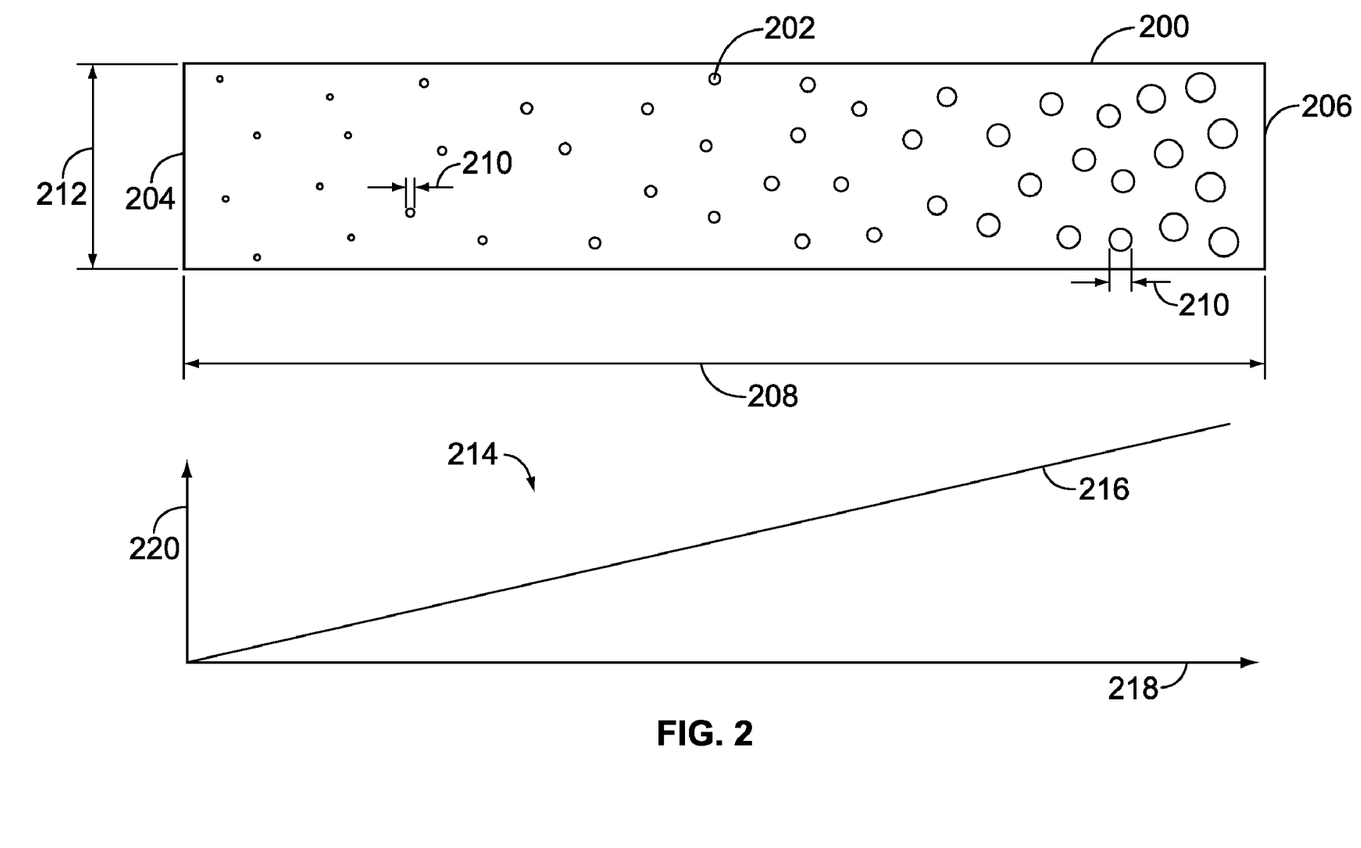
FIG. 2 is a plan view of a pattern of surface elements and a graph illustrating a gradient of the surface elements in the pattern in accordance with one embodiment of the present invention.

FIG. 2 is a plan view of a pattern 200 of surface elements 202 arranged in accordance with one embodiment. The pattern 200 of the surface elements 202 may be similar to the pattern 116 (shown in FIG. 1) of the surface elements 118 (shown in FIG. 1). The pattern 200 may be disposed on the curved outer surface 120 (shown in FIG. 1) of the light pipe 102 (shown in FIG. 1). The pattern 200 extends between opposing ends 204, 206. In one embodiment, the pattern 200 may be disposed on the light pipe 102 so that the first end 204 is located proximate to the attachment end 112 and the second end 206 is located proximate to the distal end 114. An area on the outer surface 120 of the light pipe 102 between the first end 204 and the attachment end 112 and/or between the second end 206 and the distal end 114 may not include any surface elements 202. For example, the pattern 200 may extend along a length 208 that is less than the distance between the attachment and distal ends 112, 114 in a direction parallel to the longitudinal axis 110 (shown in FIG. 1). Adjusting the length 208 of the pattern 200 may alter the length 126 (shown in FIG. 1) of the projected distribution 124 (shown in FIG. 1) of the emanating light 122 (shown in FIG. 1). For example, increasing the length 208 may increase the length 126 of the projected distribution 124 of light 122 while decreasing the length 208 may decrease the length 126 of the projected distribution 124.

The pattern 200 may extend along a width 212 in a direction transverse to the longitudinal axis 110. The width 212 of the pattern 200 may extend around less than the entire outer circumference of the outer surface 120 of the light pipe 102. For example, the width 212 may be small enough such that multiple patterns 200 may be disposed around the outer surface 120 of the light pipe 102. Alternatively, the width 212 may extend around the entire outer circumference of the light pipe 102. In one embodiment, the width 212 is approximately the same throughout the length 208 of the pattern 200. In another embodiment, the width 212 may vary across the length 208 of the pattern 200 to adjust the distribution of the light 122 (shown in FIG. 1) emanating from the light pipe 102. Adjusting the width 212 of the pattern 200 may alter the projection angle 128 (shown in FIG. 1) of the projected distribution 124 (shown in FIG. 1) of light 122. For example, increasing the width 212 may increase the projection angle 128 of the light 122. Decreasing the width 212 may decrease the projection angle 128.

The spatial density of the surface elements 202 may increase throughout the pattern 200 along the length 208 of the pattern 200. Alternatively, the spatial density may change through only a portion, or less than all, of the pattern 200. A graph 214 illustrates an example of a gradient 216 that may represent the distribution or change in the spatial density of the surface elements 202 in the pattern 200. The horizontal axis 218 in the graph 214 represents the distance along a length 208 of the pattern 200. The vertical axis 220 may represent the spatial density of the surface elements 202 in the pattern 200. As shown in FIG. 2, the spatial density of the surface elements 202 may change throughout the pattern 200 according to the gradient 216. For example, the gradient 216 may define the packing density of the surface elements 202 in the pattern 200. The gradient 216 represents the graded change of the number of surface elements 202 provided in the pattern 200 per unit area. In the example shown in FIG. 2, more surface elements 202 are provided in the pattern 200 per square unit of surface area of the pattern 200 in locations approaching the second end 206 than the first end 204. In another example, the distance between one surface element 202 and the neighboring surface elements 202 may be greater towards the first end 204 than the second end 206. While the gradient 216 is illustrated as an straight line in FIG. 2, the gradient 216 may take the form of one or more other shapes, such as a curved line or a combination of curved and straight lines.

In one embodiment, the sizes of the surface elements 202 may increase throughout the pattern 200 along the length 208 of the pattern 200. For example, the sizes of the surface elements 202 may be distributed in the pattern 200 according to the gradient 216. Alternatively, the sizes of the surface elements 202 may change through only a portion, or less than all, of the pattern 200. In the embodiment shown in FIG. 2, outside dimensions 210 of the surface elements 202 increase throughout the pattern 200 from the first end 204 to the second end 206. The outside dimensions 210 may be the greatest distance extending across the surface elements 202. By way of example only, the outside dimensions 210 may be the outer diameters of the surface elements 202. In the illustrated embodiment, the outside dimensions 210 are measured in directions parallel to the longitudinal axis 110 (shown in FIG. 1) of the light pipe 102 (shown in FIG. 1). Optionally, only one of the spatial density and the sizes of the surface elements 202 may change throughout the pattern 200. For example, only one of the spatial density and the sizes of the surface elements 202 may change in the pattern 200 according to the gradient 216. Alternatively, each of the spatial density and the sizes of the surface elements 202 may change throughout the pattern 200 according to different gradients 216.

Figure 3:
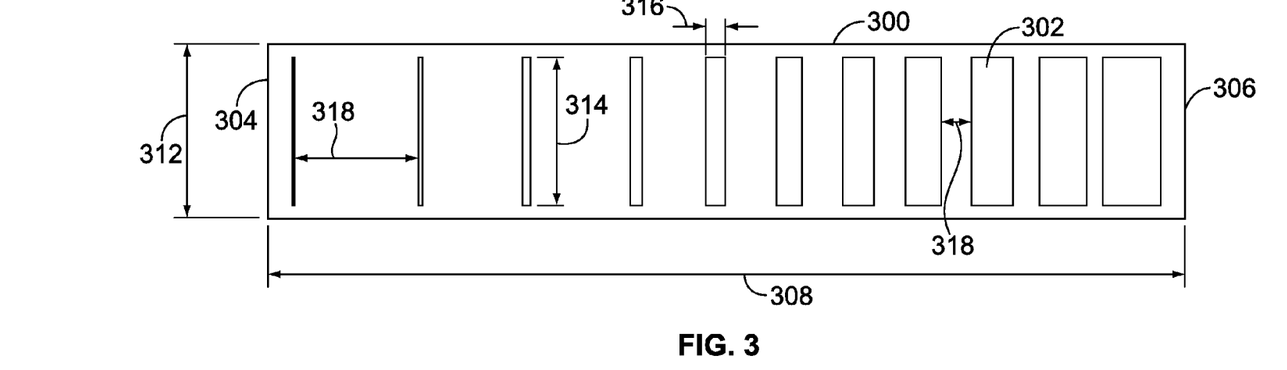
FIG. 3 is a plan view of another pattern of surface elements arranged in accordance with another embodiment of the present invention.

FIG. 3 is a plan view of a pattern 300 of surface elements 302 arranged in accordance with one embodiment. The pattern 300 of the surface elements 302 may be similar to the pattern 116 (shown in FIG. 1) of the surface elements 118 (shown in FIG. 1). The pattern 300 may be disposed on the curved outer surface 120 (shown in FIG. 1) of the light pipe 102 (shown in FIG. 1). The pattern 300 extends between opposing ends 304, 306. In one embodiment, the pattern 300 may be disposed on the light pipe 102 so that the first end 304 is located proximate to the attachment end 112 and the second end 306 is located proximate to the distal end 114. The pattern 300 may extend along a length 308 that is less than the distance between the attachment and distal ends 112, 114 in a direction parallel to the longitudinal axis 110 (shown in FIG. 1). Adjusting the length 308 of the pattern 300 may alter the length 126 (shown in FIG. 1) of the projected distribution 124 (shown in FIG. 1) of the emanating light 122 (shown in FIG. 1). For example, increasing the length 308 may increase the length 126 of the projected distribution 124 of light 122 while decreasing the length 308 may decrease the length 126 of the projected distribution 124. The pattern 300 may extend along a width 312 in a direction transverse to the longitudinal axis 110. The width 312 of the pattern 200 may extend around less than the entire outer circumference of the outer surface 120 of the light pipe 102. Adjusting the width 312 of the pattern 300 may alter the projection angle 128 of the projected distribution 124 of light 122. For example, increasing the width 312 may increase the projection angle 128 of the light 122. Decreasing the width 312 may decrease the projection angle 128.

The pattern 300 is similar to the pattern 200 (shown in FIG. 2) in that the size and spatial density of the surface elements 302 may increase along the length 308 of the pattern 300. For example, one or more of the sizes and spatial densities of the surface elements 302 may change throughout all or less than all of the pattern 300 according to a gradient that is the same as or similar to the gradient 216 (shown in FIG. 2). One difference between the patterns 300 and 200 (shown in FIG. 2) is the shape of the surface elements 302 and 202 (shown in FIG. 2). The surface elements 302 include elongated shapes having a height 314 and a width 316. In the illustrated embodiment, the surface elements 302 are strips defined by the height 314 and width 316 dimensions. The height 314 of the surface elements 302 may be measured in a direction that is transverse to the longitudinal axis 110 (shown in FIG. 1) of the light pipe 102 (shown in FIG. 1). For example, the height 314 of the surface elements 302 may be measured in a direction parallel to the direction in which the width 312 of the pattern 300 is measured. The width 316 of the surface elements 302 may be measured in a direction that is parallel to the longitudinal axis 110. Alternatively, the surface elements 302 may be provided in a shape other than a strip. For example, the surface elements 302 may be provided as ovals, squares, triangles, and the like.

As shown in FIG. 3, the spatial density of the surface elements 302 increases throughout the pattern 300 along the length 308 of the pattern 200. For example, a separation distance 318 between adjacent surface elements 302 decreases along the length 308 of the pattern 300. The spatial density of the surface elements 302 increases as the separation distance 318 decreases. Additionally, the sizes of the surface elements 302 increase throughout the pattern 300 along the length 308 of the pattern 300. For example, the width 316 of the surface elements 202 may increase throughout the pattern 300 from the first end 304 to the second end 306. Alternatively, the width 316 may remain substantially the same throughout all or at least some of the pattern 300. In another example, the height 314 of the surface elements 202 may increase throughout the pattern 300 from the first end 304 to the second end 306.

Figure 4:
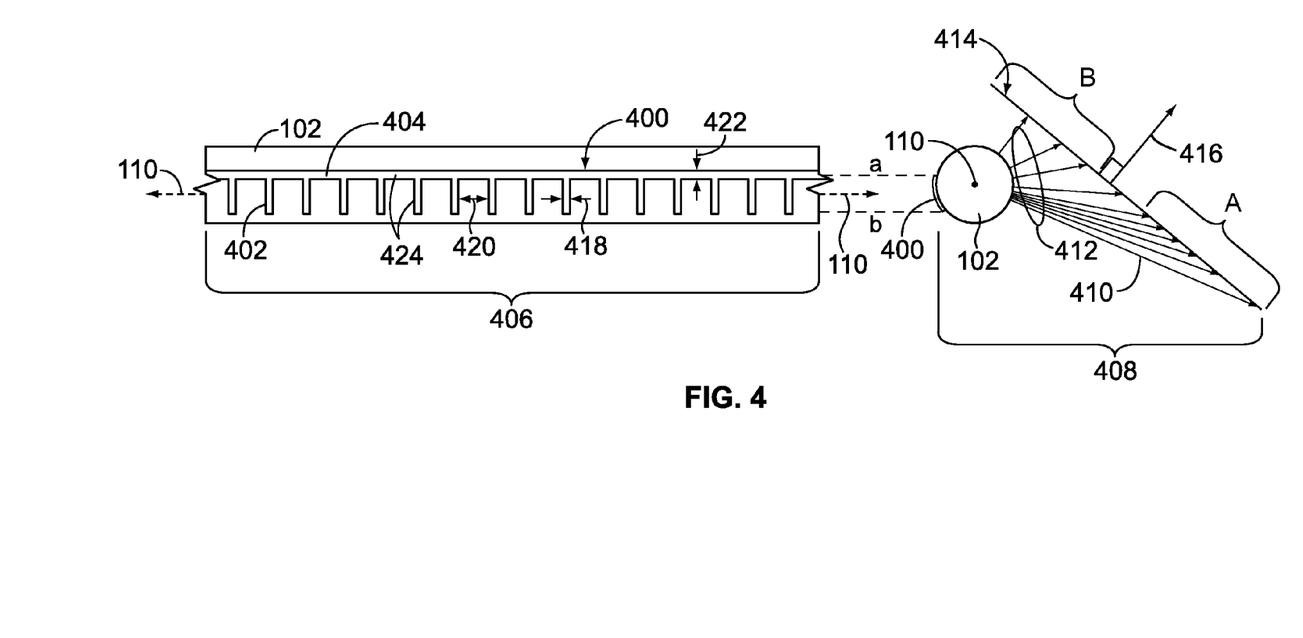
FIG. 4 illustrates a plan view of another pattern of surface elements 402 and a plan view of the distal end of the light pipe shown in FIG. 1 in accordance with another embodiment of the present invention.

FIG. 4 illustrates a plan view 406 of another pattern 400 of surface elements 424 and a plan view 408 of the distal end 114 of the light pipe 102 in accordance with another embodiment. A portion of the light pipe 102 is shown in FIG. 4. The light pipe 102 includes surface elements 424 that include strips 402 that are interconnected with one another by a line 404. The line 404 may be a surface element 424 that is positioned between the other strips 402 so as to interconnect the strips 402 with one another. As shown in FIG. 4, the strips 402 are substantially linear strips disposed in a direction transverse to the longitudinal axis 110 of the light pipe 102. For example, the individual strips 402 may be perpendicular to the longitudinal axis 110. Alternatively, the strips 402 may be positioned at an obtuse or acute angle with respect to the longitudinal axis 110. Each of the strips 402 has a width dimension 418 that is measured in a direction parallel to the longitudinal axis 110 of the light pipe 102. The width 418 of the strips 402 may be approximately the same for all strips 402 in the pattern 400 or may vary throughout the pattern 400 similar to as described above in connection with the patterns 116 (shown in FIG. 1), 200 (shown in FIG. 2), 300 (shown in FIG. 3). The strips 402 are separated from one another by a separation distance 420. The separation distance 420 may be measured in a direction that is parallel to the longitudinal axis 110. The separation distance 420 between each pair of strips 402 may be the same or may vary throughout the pattern 400.

The interconnecting line 404 extends along the light pipe 102 in a direction that is transverse to the individual strips 402. For example, the interconnecting line 404 may extend substantially parallel to the longitudinal axis 110. Alternatively, the interconnecting line 404 may be disposed at a transverse angle with respect to the longitudinal axis 110. The interconnecting line 404 has a thickness dimension 422 that is measured in a direction transverse to the longitudinal axis 110. For example, the thickness 422 of the interconnecting line 404 may be measured in a direction perpendicular to the longitudinal axis 110. The thickness 422 may be approximately the same throughout the interconnecting line 404 or may vary throughout the pattern 400.

The interconnecting line 404 connects the strips 402 such that the strips 402 and line 404 form a continuous light scattering surface on the light pipe 102. The surface elements 424 may cause light transmitted by the light pipe 102 to exit the light pipe 102 as emanating light 410 in a projection 412. The projection 412 of light 410 may provide for a more even distribution of light intensity on a surface 414 that is angled or sloped with respect to the light pipe 102. As shown in FIG. 4, the surface 414 is disposed at an angle with respect to the light pipe 102. In one embodiment, a normal direction 416 to the surface 414 is transverse to the longitudinal axis 110 of the light pipe 102. The position of the interconnecting line 404 in each of the views 406, 408 is indicated by the phantom line labeled "a" and the positions of the strips 402 in the views 406, 408 are indicated by the phantom line labeled "b." In the illustrated example, the interconnecting line 404 and strips 402 are disposed on the light pipe 102 such that the interconnecting line 404 is closer to the illuminated surface 416 than the strips 402.

Due to the continuous nature of the interconnecting line 404, or that the interconnecting line 404 extends along the longitudinal axis 110 of the light pipe 102 so as to cover a greater total surface area than the strips 402, the interconnecting line 404 nay reflect more light 410 out of the light pipe 102 than the strips 402. As a result, the light 410 that is reflected out of the light pipe 102 by the interconnecting line 404 may be more intense upon exiting the light pipe 102 than the light 410 reflected by the strips 402. The more intense light that is reflected by the interconnecting line 404 may be directed toward the portion of the angled surface 414 that is farther away from the light pipe 102 while the less intense light that is reflected by the strips 402 may be directed toward the portion of the angled surface 414 that is closer to the light pipe 102. For example, the light 410 that is reflected out of the light pipe 102 by the interconnecting line 404 may strike the surface 414 in the illuminated area labeled "A" and the light 410 that is reflected out of the light pipe 102 by the strips 402 may strike the surface 414 in the illuminated area labeled "B." As shown in FIG. 4, the "A" area of the surface 414 is farther away from the light pipe 102 than the "B" area. By aligning the pattern 400 on the light pipe 102 and by aligning the light pipe 102 with respect to the surface 414, the more intense light 410 that is reflected by the interconnecting line 404 may be directed towards the farther away area "A" of the surface 414 than the less intense light 410 that is reflected by the strips 402 and directed toward the closer area "B" of the surface 414. Directing the reflected light from the pattern 400 in this manner may provide a more uniform distribution of the intensity of the light on the surface 414.

Figure 5:
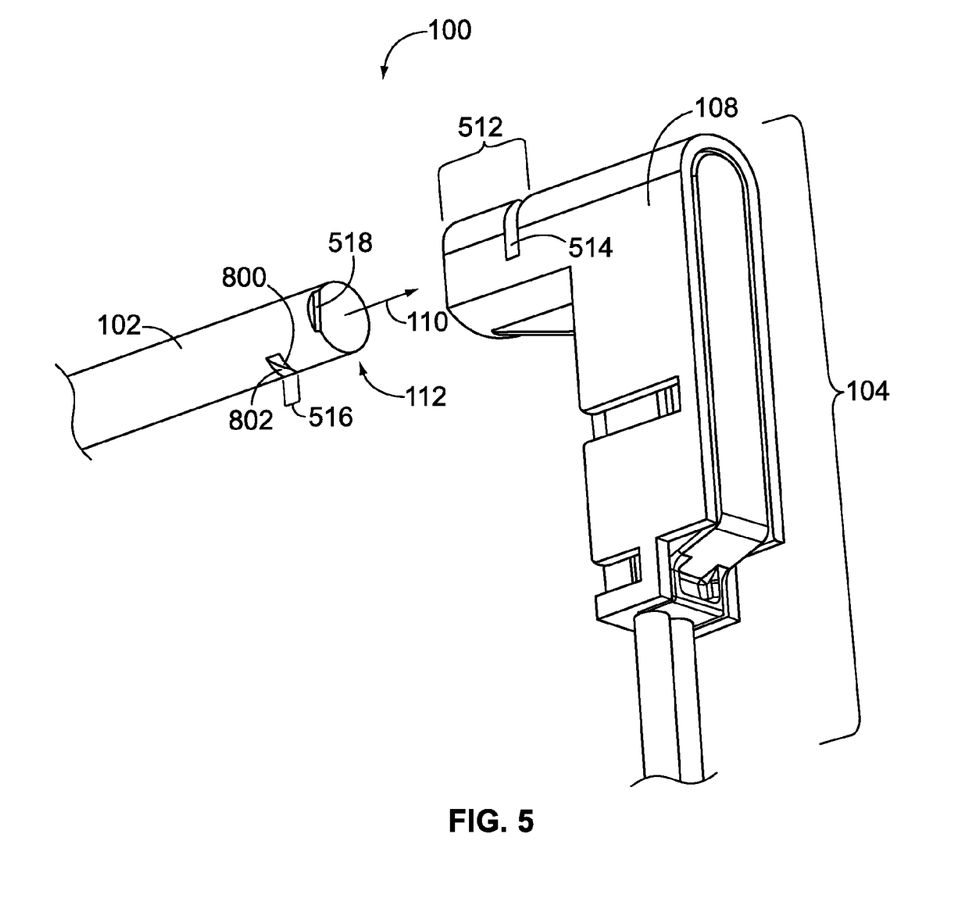
FIG. 5 is a rear exploded isometric partial view of the light pipe assembly shown in FIG. 1 implemented in accordance with one embodiment of the present invention.
Figure 6:
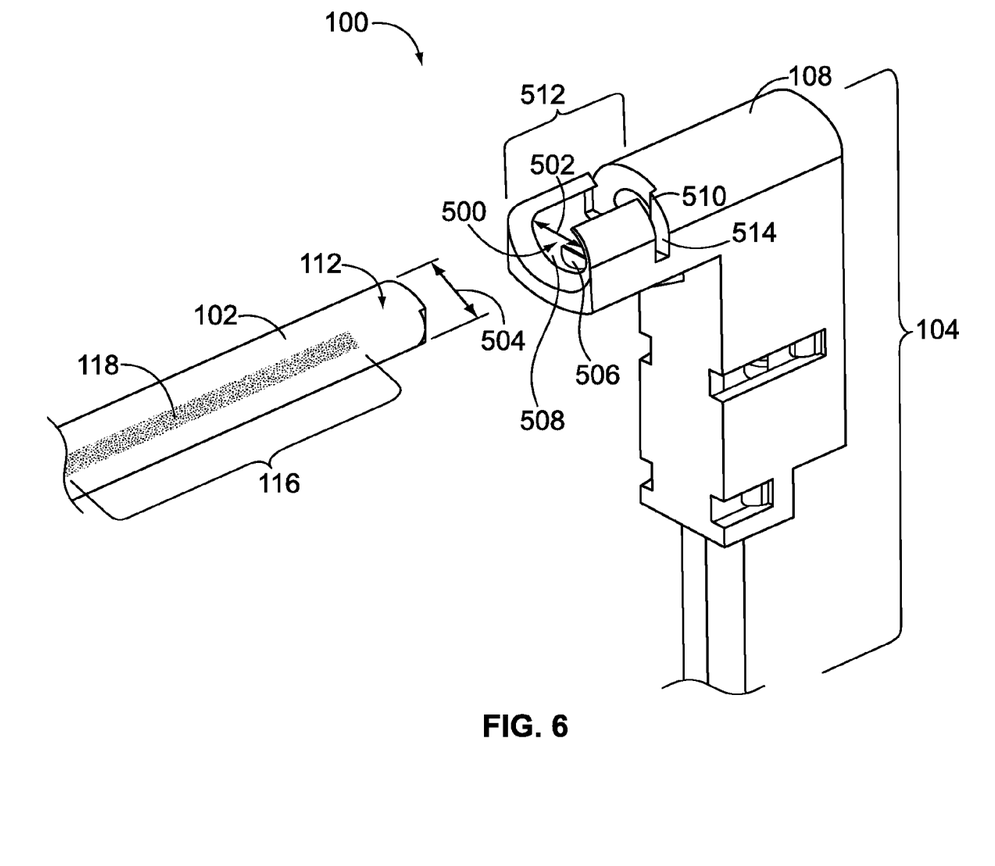
FIG. 6 is a front exploded isometric partial view of the light pipe assembly shown in FIG. 1 according to one embodiment of the present invention.
Figure 7:
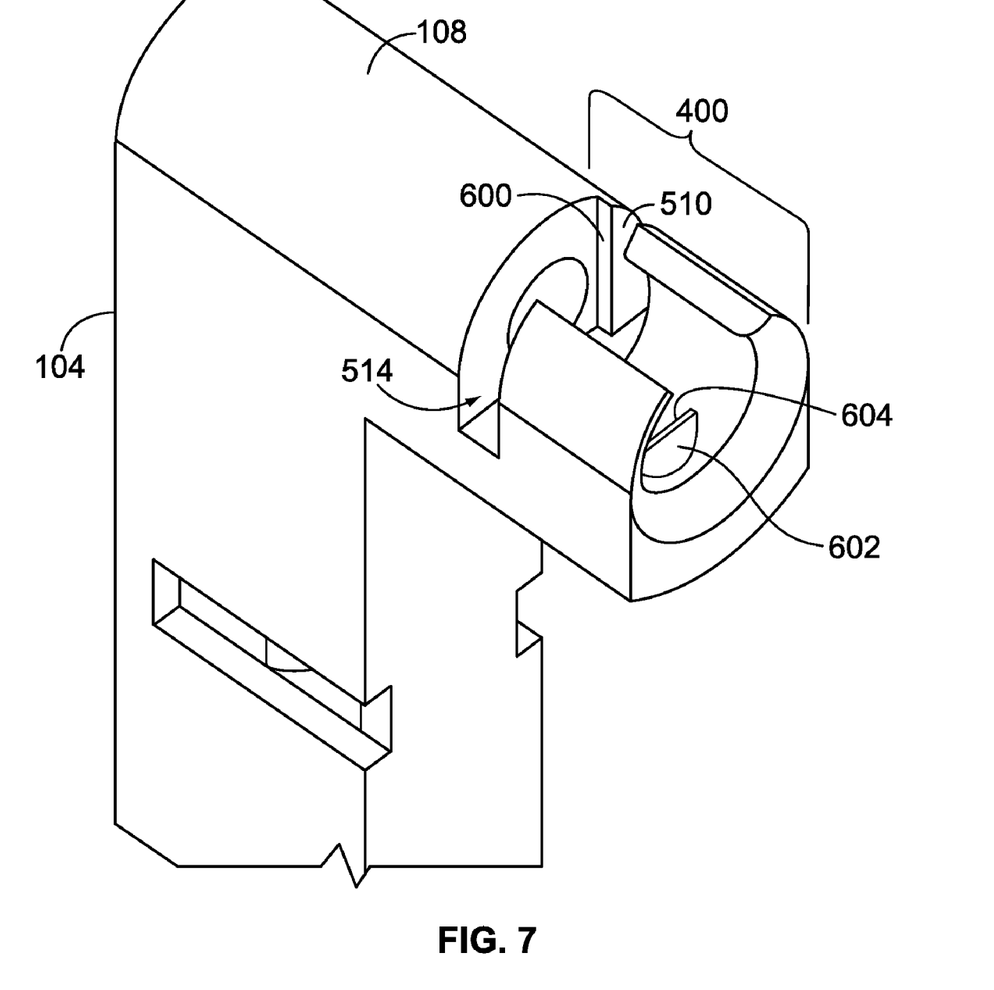
FIG. 7 is a front isometric view of a housing of a lamp assembly shown in FIG. 1 according to one embodiment of the present invention.

FIG. 5 is a rear exploded isometric partial view of the light pipe assembly 100 implemented in accordance with one embodiment. FIG. 6 is a front exploded isometric partial view of the light pipe assembly 100 according to one embodiment. FIG. 7 is a front isometric view of the housing 108 of the lamp assembly 104 according to one embodiment. As shown in FIGS. 5 and 6, the housing 108 of the light pipe assembly 100 includes a mating portion 512 (FIG. 5) for attaching the light pipe 102 to the lamp assembly 104. The mating portion 512 includes an opening 500 (FIG. 6) into which the attachment end 112 of the light pipe 102 is loaded to mount the light pipe 102 in the lamp assembly 104. An inside dimension 502 (FIG. 6) of the opening 500 may be less than an outer diameter 504 (FIG. 6) of the light pipe 102 to provide an interference fit between the light pipe 102 and the lamp assembly 104. When the attachment end 112 of the light pipe 102 is loaded into the mating portion 512 of the housing 108, the opening 500 may expand to accommodate the light pipe 102. One or more slits 514 (FIG. 5) in the mating portion 512 may be provided to permit expansion of the opening 500.

One or both of the light pipe 102 and the lamp assembly 104 may include orientation features to align the light pipe 102 with respect to the lamp assembly 104. Aligning the light pipe 102 with the lamp assembly 104 may permit the light emanating from the light pipe 102 to be directed in a desired or predetermined direction. In one embodiment, the orientation features that align the light pipe 102 with respect to the lamp assembly 104 include a notch 518 (FIG. 5) in the light pipe 102 and a step 510 (FIG. 6) in the lamp assembly 104. Alternatively, the notch 518 may be included in the housing 108 of the lamp assembly 104 and the step 510 may be provided in the light pipe 102. The step 510 includes a generally flat lip 600 (FIG. 7) along the inside of the step 510. The notch 518 includes a recess in the attachment end 112 of the light pipe 102 that is shaped to mate with the step 510. The notch 518 may be formed such that the cross-sectional area of the light pipe 102 in a section that includes the notch 518 and that is measured in a plane perpendicular to the longitudinal axis 110 is less than the cross-sectional area of the light pipe 102 in a section that does not include the notch 518 and that is measured in a plane perpendicular to the longitudinal axis 110.

The step 510 and notch 518 may have complimentary shapes such that the step 510 and notch 518 nest with one another when the light pipe 102 is loaded into the housing 108. The engagement between the orientation features of the light pipe 102 and the lamp assembly 104 limits or inhibits rotation of the light pipe 102 with respect to the housing 108 of the lamp assembly 104. Preventing rotation of the light pipe 102 may ensure that the pattern 116 of surface elements 118 is oriented in a desired direction. For example, the notch 518 and step 510 may be disposed in a desired location with respect to the pattern 116 in order to direct the light 122 (shown in FIG. 1) emanating from the light pipe 102 along a desired direction or path.

In one embodiment, the orientation features secure the light pipe 102 to the lamp assembly 104. For example, the orientation features may include a slot 516 (FIG. 5) in the light pipe 102 and a rib 506 (FIG. 6) in the housing 108 of the lamp assembly 104. The slot 516 and rib 506 may engage one another to prevent removal of the light pipe 102 from the housing 108 in a direction parallel to the longitudinal axis 110 of the light pipe 102. The slot 516 extends along the outer circumference of the light pipe 102 near the attachment end 112. As shown in FIG. 5, the notch 518 and slot 516 in the light pipe 102 may be circumferentially offset from one another along the outer surface 120 of the light pipe 102. The slot 516 may include a front wall 800 and a rear wall 802 spaced apart from one another in a direction parallel to the longitudinal axis 110. The rib 506 may include a ramp surface 602 (FIG. 7) joined to a latch surface 604 (FIG. 7). The ramp surface 602 may be positioned transverse to the latch surface 604 and extend between an inner surface 508 (FIG. 6) of the housing 108 and the latch surface 604. The latch surface 604 may extend between the inner surface 508 and the ramp surface 602. Alternatively, the ramp and latch surfaces 602, 604 may be positioned parallel to one another with a third surface (not shown) interconnecting the ramp and latch surfaces 602, 604. For example, the ramp and latch surfaces 602, 604 may be parallel to one another and each extend between the inner surface 508 and the third surface.

Figure 8:
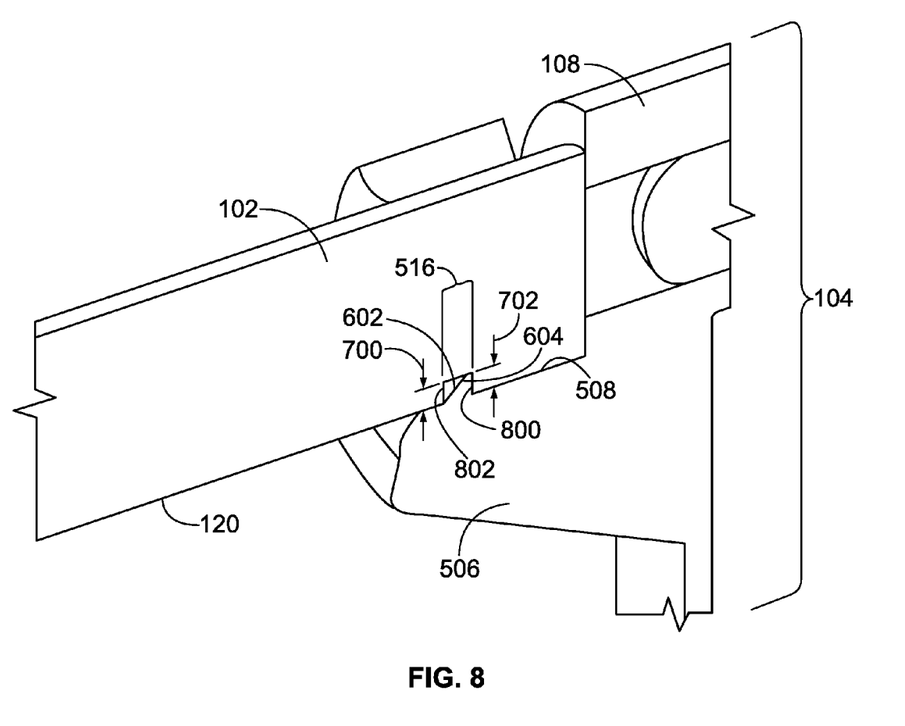
FIG. 8 is an isometric cross-sectional view of a light pipe shown in FIG. 1 attached to a lamp assembly shown in FIG. 1 taken along line 7-7 in FIG. 1 according to one embodiment of the present invention.

FIG. 8 is an isometric cross-sectional view of the light pipe 102 attached to the lamp assembly 104 taken along line 7-7 in FIG. 1 according to one embodiment. As shown in FIG. 8, the rib 506 is received in the slot 516 between the front and rear walls 800, 802 to secure the light pipe 102 to the housing 108 of the lamp assembly 104. The ramp surface 602 slides along the front wall 800 of the slot 516 as the light pipe 102 is loaded into the housing 108. The latch surface 604 engages the front wall 800 to prevent removal of the light pipe 102 from the lamp assembly 104. A depth 700 of the slot 516 represents the radial distance that the slot 516 extends into the light pipe 102 from the outer surface 120 of the light pipe 102. A height 702 of the rib 506 represents the distance that the rib 506 protrudes from the inner surface 508 of the housing 108. The depth 700 of the slot 516 and the height 702 of the rib 506 may be approximately matched with one another such that the rib 506 is entirely received with in the slot 516. For example, the height 702 of the rib 506 may be approximately the same as the depth 700 of the slot 516. A variety of materials may be used for the light pipe assembly 100 (shown in FIG. 1). For example, materials that are elastic enough to allow insertion of the light pipe 102 into the housing 108 and provide a sufficient retention force once the light pipe 102 is inserted therein, and/or to expand and retract a sufficient amount to allow the light pipe 102 to be secured to the housing 108.

Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §1102, sixth paragraph, unless and until such claim limitations expressly use the phrase "means for" followed by a statement of function void of further structure.

What is claimed is:

1. A light pipe assembly comprising:
a lamp assembly having a housing that holds a light source configured to emit a light, the housing including a first orientation feature that projects from a surface of the housing; and
a light pipe elongated between an attachment end and an opposing distal end, the attachment end received in the housing of the lamp assembly and including a second orientation feature that extends inward from an outer surface of the light pipe, the light pipe receiving light emitted by the light source, the light pipe including surface elements configured to permit the light to emanate from the light pipe between the attachment and distal ends, the surface elements arranged in a pattern that provides a predetermined distribution of light emanating from the light pipe, wherein the first orientation feature of the housing is received in the second orientation feature of the light pipe such that the distribution of light emanates in a predetermined direction relative to the lamp assembly.

2. The assembly of claim 1, wherein a distribution of the surface elements in the pattern proximate to the attachment end differs from a distribution of the surface elements in the pattern proximate to the distal end.

3. The assembly of claim 1, wherein the surface elements are individual surface elements separated from one another.

4. The assembly of claim 1, wherein a size of the surface elements in the pattern proximate to the attachment end differs from a size of the surface elements in the pattern proximate to the distal end.

5. The assembly of claim 1, wherein a spatial density of the surface elements in the pattern proximate to the attachment end differs from a spatial density of the surface elements in the pattern proximate to the distal end.

6. The assembly of claim 1, wherein the light pipe is elongated along a longitudinal axis and the surface elements comprise elongated strips oriented transverse to the longitudinal axis.

7. The assembly of claim 6, wherein the surface elements comprise the strips interconnected with one another in a direction along the longitudinal axis.

8. The assembly of claim 1, wherein the surface elements comprise light scattering elements disposed on an outer surface of the light pipe.

9. The assembly of claim 1, wherein the lamp assembly includes a protruding rib and the light pipe includes a slot that is recessed into the light pipe, the rib preventing removal of the light pipe from the lamp assembly when the rib is received into the slot.

10. A light pipe assembly comprising:
a lamp assembly including a housing and a light source, the housing having a mating portion with a protruding securing feature extending away from a surface of the housing, the light source configured to emit light; and
a light pipe elongated between an attachment end and an opposing distal end and configured to receive light emitted by the light source, wherein the attachment end is coupled with the mating portion of the housing and includes a recessed securing feature that extends inward from an outer surface of the light pipe, the attachment end of the light pipe secured to the housing of the lamp assembly when the protruding securing feature is received into the recessed securing feature.

11. The assembly of claim 10, wherein the protruding securing feature of the lamp assembly and the recessed securing feature of the light pipe inhibit rotation of the light pipe with respect to the housing.

12. The assembly of claim 10, wherein the protruding securing feature of the lamp assembly includes a latch surface that engages an interior surface of the recessed securing feature of the light pipe and prevents removal of the light pipe from the housing in a direction parallel to a longitudinal axis of the light pipe.

13. The assembly of claim 10, wherein at least one of the mating portion of the housing or the attachment end of the light pipe includes a notch and the other one of the mating portion and the attachment end includes a step, the step and notch shaped to nest with one another to align the light pipe with respect to the housing.

14. The assembly of claim 10, wherein the mating portion of the housing includes a latch as the protruding securing feature and the attachment end of the light pipe includes a slot as the recessed securing feature.

15. The assembly of claim 10, wherein the light pipe comprises surface elements configured to permit the light to emanate from the light pipe between the attachment and distal ends, wherein the surface elements are arranged in a pattern that provides a predetermined distribution of light emanating from the light pipe.

16. The assembly of claim 15, wherein the surface elements are positioned on the light pipe such that the light emanating from the light pipe through the surface elements is approximately uniform along the longitudinal axis of the light pipe.

17. The assembly of claim 15, wherein at least one of a size and a spatial density of each of the surface elements increases as a gradient between the attachment and distal ends of the light pipe.

18. A light pipe assembly comprising:
a lamp assembly having a housing that holds a light source configured to emit light, the housing including a step and a rib protruding from a surface of the housing; and
a light pipe extending between an attachment end and an opposing distal end, the attachment end received in the housing of the lamp assembly and including a recessed notch and a recessed slot, the notch having a shape that is complimentary to the step of the housing, the slot positioned to receive the rib of the housing, the light pipe receiving light emitted by the light source, the light pipe including light-reflective surface elements that reflect the light received by the light pipe in directions out of the light pipe between the attachment and distal ends, the surface elements including a plurality of reflective strips interconnected by a reflective line, wherein an engagement between the step of the housing and the notch of the light pipe orients a direction in which light emanates from the light pipe and an engagement between the rib of the housing and the slot of the light pipe secures the light pipe in the housing.

19. The assembly of claim 18, wherein the reflective strips are disposed transverse to a longitudinal axis of the light pipe and the reflective line is disposed approximately parallel to the longitudinal axis.

20. The assembly of claim 18, wherein the surface elements are arranged on the light pipe to provide an approximately even distribution of light intensity on a surface that is angled with respect to the light pipe.

* * * * *